United States Patent [19]

Lefevre

[11] Patent Number: 5,795,230
[45] Date of Patent: Aug. 18, 1998

[54] TORSION DAMPER HAVING SEVERAL FRICTION STAGES

[75] Inventor: Gerard Lefevre, Saleux, France

[73] Assignee: Valeo, Paris, France

[21] Appl. No.: 702,473

[22] PCT Filed: Dec. 21, 1995

[86] PCT No.: PCT/FR95/01708

§ 371 Date: Nov. 22, 1996

§ 102(e) Date: Nov. 22, 1996

[87] PCT Pub. No.: WO96/20357

PCT Pub. Date: Jul. 4, 1996

[30] Foreign Application Priority Data

Dec. 26, 1994 [FR] France ................................. 94 15634

[51] Int. Cl.⁶ .................................................. F16D 3/14
[52] U.S. Cl. ................. 464/63; 192/213.12; 192/213.31; 464/68
[58] Field of Search ................. 192/213.12, 213.1, 192/213.11, 214.1, 213.31; 74/574; 464/63, 68

[56] References Cited

U.S. PATENT DOCUMENTS

| 3,863,747 | 2/1975 | Werner et al. ............... 192/213.31 |
| 3,931,876 | 1/1976 | Beeskow et al. ............. 192/213.31 |
| 4,562,913 | 1/1986 | Cucinotta et al. ............. 464/68 X |
| 4,573,562 | 3/1986 | DeLand ............................ 464/68 X |
| 4,603,767 | 8/1986 | Blond ............................. 192/213.12 |
| 4,606,451 | 8/1986 | Martinez-Corral et al. .... 464/63 X |
| 4,669,593 | 6/1987 | Raab et al. ..................... 192/213.11 |
| 4,903,812 | 2/1990 | Fischer et al. ................. 464/63 |
| 5,246,398 | 9/1993 | Birk et al. ...................... 464/63 |

FOREIGN PATENT DOCUMENTS

| 2365728 | 4/1978 | France . |
| 2532019 | 2/1984 | France . |
| 2551153 | 3/1985 | France . |
| 2430160 | 2/1975 | Germany . |
| 4417660 | 12/1994 | Germany . |
| 2254398 | 10/1992 | United Kingdom . |

Primary Examiner—Randolph A. Reese
Assistant Examiner—Eileen A. Dunn
Attorney, Agent, or Firm—Longacre & White

[57] ABSTRACT

A main friction stage (45) is axially arranged on either side of one of the guide washers (13, 14) surrounding a hub disc (22), the main friction stage (45) comprises two bearing washers (47, 48) arranged on either side of one guide washer (14) and joined together by axial braces (49) extending through the one guide washer (14), a friction washer (50) rotationally coupled to the hub disc and inserted between the guide washer and one of the bearing washers (47, 48), and a resilient clamping washer (56) inserted between the guide washer and the other bearing washer.

8 Claims, 1 Drawing Sheet

TORSION DAMPER HAVING SEVERAL FRICTION STAGES

BACKGROUND OF THE INVENTION a) Field of the Invention

The invention concerns a torsion damper comprising coaxial parts mounted rotatably in relation to one another, several circumferentially acting elastic damping stages arranged between these and several friction stages acting between the said coaxial parts; the invention more particularly concerns the structure of the friction stages. Such a torsion damper can be applied notably to the friction clutch of a motor vehicle.

b) Description of Related Art

In a torsion damper of the type designated above, forming for example a friction clutch, one of the rotary parts carries a friction disc, designed to be fixed with respect to rotation to a first shaft, in practice a driving shaft, such as the crankshaft of the engine in the case of a motor vehicle, whilst another rotary part has a hub by means of which it is designed to be fixed with respect to rotation to a second shaft, in practice a driven shaft such as the input shaft of a gearbox in the envisaged case. A main damping stage comprises a hub disc having internal teeth mounted with a predetermined angular clearance on the external teeth of the said hub and two annular flanges, called guiding washers, disposed axially on either side of the said hub disc. The circumferentially acting elastic means of this main damping stage are interposed between the disc and the guiding washers. The delimitation of the possible angular movement between the hub and the hub disc is determined by the circumferential clearance between the teeth. A sub-assembly for preliminary torsion damping is often interposed between the hub and the disc in order, notably, to filter the vibrations in the idling range of the speed of the internal combustion engine of the vehicle. It comprises circumferentially acting elastic means of lesser stiffness than those of the main damping stage, acting circumferentially between two guiding washers of smaller diameter coupled to the hub disc and an auxiliary disc fixed to the hub.

Several axially acting friction stages are arranged "in parallel" with the friction stages. Of particular note is a main friction stage whose friction is controlled in order to be exerted jointly with the main damping stage. Other stages with lower friction are provided to act in lower torque ranges. In all cases, it is desirable that the load of each friction stage can be controlled easily and that the said friction stages be relatively independent of one another and can be controlled with precision.

To this end it is advantageous that the axially acting springs (in practice crinkle washers or Belleville washers) which are designed to adjust the load of the different friction stages, have relatively large diameters. However, the friction stages must not increase the axial dimension of the torsion damper.

SUMMARY OF THE INVENTION

The invention provides a satisfactory solution to all these problems.

More precisely, the invention concerns a torsion damper having several circumferentially acting elastic damping stages and several axially acting friction stages, of the type comprising a hub designed to be connected to a driven shaft and a main damping stage having a hub disc equipped with internal teeth mounted with predetermined angular clearance on external teeth of the said hub, two annular flanges or guiding washers disposed axially on each side of the said hub disc and elastic means interposed circumferentially between the disc and the said guiding washers, characterised in that a main friction stage is arranged on each side of one of the guiding washers, axially, and has two bearing washers disposed on each side of the said guiding washer and joined by braces of axial orientation passing through the said guiding washer, a friction washer coupled with respect to rotation to the said hub disc and inserted between the guiding washer and a bearing washer, and an elastic clamping washer inserted between the same guiding washer and the other bearing washer.

The arrangement as defined above allows the creation of a sub-assembly and makes free a certain amount of annular space radially on the inside of the elements constituting the main damping stage. In addition, the elastic clamping washer makes it possible to clamp the friction washer in contact of the guiding washer concerned, by virtue of the braced bearing washers.

It is thus possible to precisely control clamping, and this independently, with no action being exerted for example on the sub-assembly for preliminary damping.

According to another advantageous characteristic of the invention, another friction stage is housed in the space made free between the hub and the same guiding washer. This stage of relatively low friction is designed to act in the area of angular movement of the sub-assembly for preliminary torsion damping. It comprises an annular bearing centred by the said guiding washer, a protective washer inserted axially between a radial shoulder of the hub and this bearing and an axially acting elastic washer, inserted between the said bearing and the said guiding washer.

Finally, an intermediate friction stage is arranged between the hub disc and the guiding washer of the said main friction stage. The axially acting elastic washer of this stage has substantially the same diameter as that of the main friction stage.

More precisely, the intermediate friction stage has a friction washer in contact with the hub disc. This friction washer comprises means of meshing with clearance with the said hub, a bearing washer in contact with the said friction washer and an elastic clamping washer inserted between this bearing washer and one of the bearing washers of the main friction stage. The bearing washer in contact with the friction washer is connected with respect to rotation with the said guiding washer, about which is arranged the said main friction stage.

Thus the friction stages are located radially below the circumferentially acting elastic means of the main damping stage. In this way the different frictions can be controlled precisely and independently.

BRIEF DESCRIPTION OF THE DRAWINGS

The invention will be better understood and further advantages thereof will become clearer in the light of the description which follows of a torsion damper forming a friction clutch, in accordance with its principle, given solely by way of example and written with reference to the accompanying drawing, in which.

DETAILED DESCRIPTION OF PREFERRED EMBODIMENTS

Figure 1:
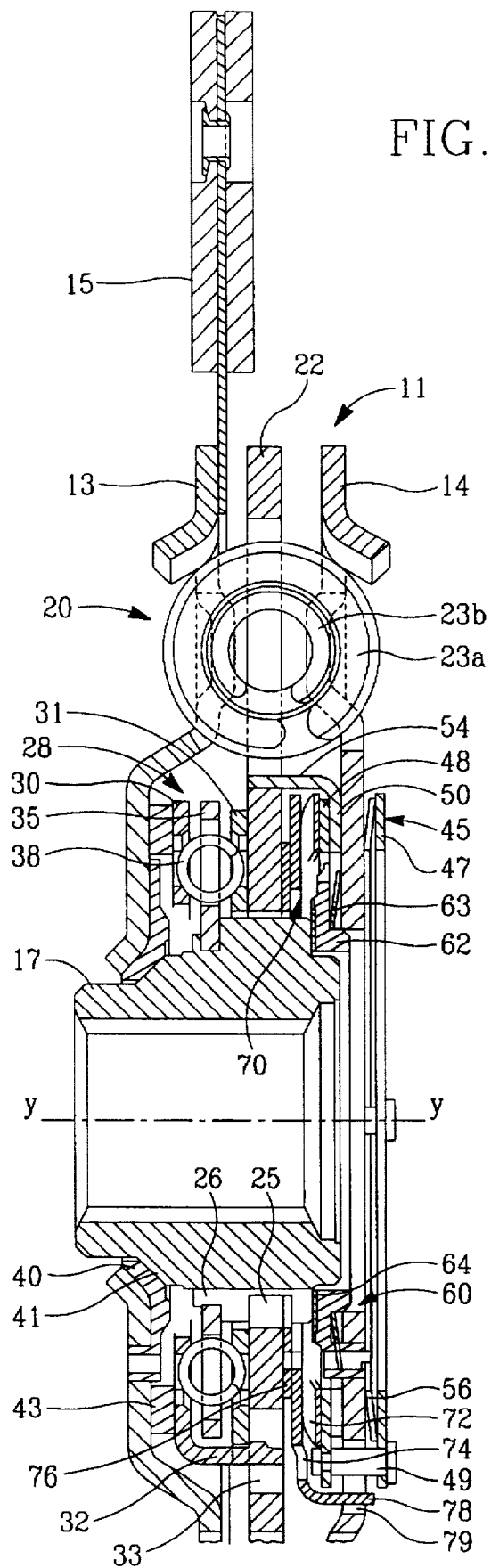
FIG. 1 is a partial view in cross-section and in elevation of the torsion damping device in question.

With reference to this drawing, a torsion damper 11 has been depicted, forming a friction clutch and having several parts mounted rotatably in relation to one another, of common axis y—y. One of the parts essentially comprises two annular flanges 13, 14, jointly referred to as guiding washers, one of which carries a friction disc 15. Another part consists of a tubular hub 17, fluted internally in order to be able to be fixed with respect to rotation to a driven shaft, in this case the input shaft of a gearbox, not depicted. The two guiding washers 13, 14 are joined together by braces of axial orientation (not visible on the drawing) serving, in a manner known per se, also to fix the disc 15 to the guiding washer 13. These braces pass with circumferential clearance through a hub disc 22, described hereinafter, in a manner known per se. The friction disc 15 is designed to be fixed with respect to rotation to a driving shaft, in this case the crankshaft of an internal combustion engine, by being clamped, by means of its friction linings, by a clutch operation between a pressure plate and a reaction plate (not depicted) connected to the crankshaft. A main damping stage 20 is defined between the friction disc 15 and the hub 17. In a conventional manner, this circumferentially acting elastic damping stage is arranged between the guiding washers 13, 14 and the hub disc 22 extending between the washers. Coil springs 23a, 23b are installed in pairs, in the apertures produced opposite one another in the guiding washers 13, 14 on the one hand and the hub 22 on the other hand, in order to form circumferentially acting elastic means of this main damping stage.

The hub disc 22 has internal teeth 25 capable of cooperating with external teeth 26 on the hub 17. A predetermined circumferential clearance is provided between the teeth of the hub disc 22 and those of the hub 17, so as to determine a possible angular movement between the teeth. Here, each teeth 25, 26 comprises teeth of trapezoidal shape alternated with notches.

In addition, a sub-assembly for preliminary torsion damping 28 is interposed between the hub 17 and the hub disc 22. This sub-assembly is inserted axially between one of the guiding washers (here the guiding washer 13) and the hub disc 22. It comprises, radially below the springs 23a, 23b, two flanges 30, 31 forming guiding washers, of smaller diameter, joined together by snapping-in, by virtue of the axially oriented lugs 32 projecting from the flange 30, which are engaged in holes 33 in the hub disc 22 for rotational connection of the guiding washers 30, 31 with the disc 22.

An auxiliary disc 35 inserted axially between the two small guiding washers 30, 31 is fixed by crimping to the hub 17. In a manner similar to the main damping stage, circumferentially acting elastic means, here helical springs, are arranged in apertures opposite each other in the small guiding washers 30, 31 and auxiliary disc 35 in order to act circumferentially between them. These circumferentially acting elastic means consist of springs 38 of lower stiffness than those fitted to the main damping stage.

The guiding washer 13 is connected in rotation to a cone bearing 40 which is friction-mounted on a corresponding conical surface 41, defined on the outside of the hub 17. The bearing 40 has, in a manner known per se, pins (not referenced) engaged in apertures in the guiding washer 13 for its fixing with respect to rotation with the latter. In addition, a friction washer 43 is inserted between the internal face of this guiding washer 13 and the adjacent guiding washer 30, of small diameter, of the sub-assembly for preliminary torsion damping 20, so as to avoid metal-to-metal contact, the guiding washers 30, 13 being metallic.

According to an important characteristic of the invention, a main friction stage 45 is arranged axially on each side of the guiding washer 14. It has two bearing washers 47, 48 disposed on each side of the guiding washer 14 and joined together by braces 49 of axial orientation, passing through the guiding washer 14. A friction washer 50 is coupled with respect to rotation to the hub disc 22 and inserted between the guiding washer 14 and one of the bearing washers, here the internal bearing washer 48. The connection with respect to rotation between this friction washer 50 and the hub disc 22 is produced by axially folded lugs 54 on the said friction washer, engaged in the apertures in the hub disc which house the elastic means of the main damping stage. This connection is established with a chosen circumferential clearance, the lugs 54 entering with circumferential clearance the indents provided in the longitudinal internal edges of the said apertures. Assembly is completed by an elastic clamping washer 56 (for example a Belleville washer) inserted between the same guiding washer 14 and the other, external, bearing washer 47.

As can be seen on the drawing, the assembly which has just been described makes it possible to have a friction washer 50 and an elastic washer 56 of quite large diameter, which is favourable with respect to adjustment and the reproducibility of the desired friction force. In addition, in an advantageous manner a sub-assembly of a guiding washer 14 and main friction stage is formed. Furthermore, this arrangement makes free an annular space radially on the inside of the elements constituting the said main friction stage. This is used to advantage to house another friction stage 60 (developing a low friction in relation to the elastic damping of the sub-assembly for preliminary damping 28). This friction stage comprises an annular fixing bearing 62, rotatably mounted with radial clearance on an annular surface of the hub, a protective washer 64 inserted axially between a radial shoulder on the hub and the said annular bearing and an axially acting elastic washer 63, here of the Belleville washer type, inserted between the said bearing 62 and the said guiding washer 14. The elastic washer 63 also determines the friction of the cone bearing 40 and of the friction washer 43. The washer 64 (in contact with the external teeth 26 of the hub) prevents damage to the bearing 62, here made of plastic like the bearing 40. It will be noted that the bearing 62 is connected with respect to rotation by pins to the guiding washer 14 and has, in cross-section, the shape of an L. The pins are engaged in apertures in the guiding washer 14. The bearing 62 holds and centers internally the elastic washer 63.

Finally, an intermediate friction stage 70 can also be installed between the hub disc 22 and the guiding washer 14 of the said main friction stage, at a radial distance substantially equal to that where the main friction stage 45 is located. This intermediate friction stage 70 also has an axially acting elastic washer 72, here a crinkle washer, having substantially the same diameter as that of the main friction stage. This elastic clamping washer is inserted between the internal bearing washer 48 of the main friction stage 45 and a bearing washer 74 in contact with a friction washer 76, itself in rubbing contact with a face of the hub disc 22. This friction washer 76 comprises on the inside meshing means with teeth and notches cooperating with the external teeth 26 of the hub. The bearing washer 74 is fixed with respect to rotation to the guiding washer 14 by lugs 78 folded in an axial direction and engaged without circumferential clearance in holes 79 in the said guiding washer 14. The lugs 78 extend radially above the braces 49 passing through the said holes 79 without circumferential clearace. The friction washer 76 constitutes a slide washer and makes it possible to damp the noises due to the impacts caused by the interaction of the teeth 25 on the disc 22 with the teeth 26 in the form of flutes on the hub 17. Of course, in order to do this, the washer 76 meshes with the hub 17 with circumferential clearance less than that provided between the teeth 25, 26. It is thus possible to choose the value of the weight of the washer 72, lower here than the value of the weight of the washer 56. For the record, it is pointed out that, in a first phase of angular movement between the hub 17 and the disc 15, the main damping stage 20 forms a unit owing to the high stiffness of the springs 23a, 23b.

The springs 38 of the sub-assembly for preliminary torsion damping 28 are thus compressed. This phase continues until the clearance between the teeth 25, 26 is eliminated. From this moment, the hub disc 22 moves in relation to the guiding washers 13, 14, with the action of the friction washer 50, the springs 38 remaining stretched. Of course, the washer 76 makes it possible to damp the impacts caused by the interaction of the teeth on the disc 22 with those on the hub 17 in the aforementioned manner.

The present invention is not restricted to the example embodiment described. In particular, the bearing 40 is not necessarily conical; it can have, in cross-section, the shape of the bearing 62, the part 41 then being cylindrical. In a general manner, this bearing 40 centres the guiding washer 13 and thus the guiding washer 14.

Whereas in the illustrated figure the limitation of the angular movement between the disc 15 and the hub 17 is produced by the abutment of the braces connecting between them the guiding washers 13, 14 with the relevant edges of the apertures in the hub disc 22 through which they pass, this limitation of the movement can be produced by the turns of the springs 23a, 23b becoming contiguous.

The disc 15 can be devoid of friction linings and be fixed directly to a plate fixed to the crankshaft of the engine. In a variant it is the washer 13 which is fixed to the said plate.

The guiding washers 30, 31 can be made of plastic so that the presence of the washer 43 is not obligatory.

The lugs 78 of the washer 74 can be extended and be deformed for example laterally or radially towards the outside at their free end in order to form shoulders in contact with the external face of the bearing washer 47. Thus the washers 74 and 72 can be integrated in the guiding washer 14/main friction stage sub-assembly.

This is the reason why the bearing washer 74 is perforated opposite the rivets 49 in order to form the said sub-assembly.

Of course, instead of being metallic, as in FIG. 1, the washers 74, 50, 47, 48 can be made of plastic.

As will have been understood, the load of each friction stage is independent in relation to that of the other stages. These friction stages are located radially below the springs 230. Here the friction stage 45 has a load greater than the intermediate friction stage 70, which itself has a load greater than the friction stage 60. Here the friction washer 50 acts in a different manner since the lugs 54 enter with circumferential clearance into the indents of the apertures of the disc 22.

Thus, at the start of the relative movement between the disc 22 and the guiding washers 13, 14, the friction stage 70 acts alone.

More precisely, before the angular clearance between the teeth of the hub disc 22 and the hub 17 is taken up, the two faces of the friction washer 76 rub against the said disc 22 and the washer 74 of the friction stage.

After the clearance between the teeth has been taken up, only friction is produced between the washers 76, 74.

Thus an optimal filtration of vibrations is obtained, notably when the main friction stage 20 has springs 23b, 23a, of different stiffness and staged action.

Of course, as a variant, the lugs 54 can enter the aforementioned indents without circumferential clearance. Likewise, some of the circumferentially acting elastic means can consist of blocks of elastic material, such as an elastomer.

It will be appreciated that the guiding washer 14 is not modified profoundly, only the hole 49 is modified so that the solution according to the invention is economical.

It will also be appreciated that the elastic washer 56 is well protected by the bearing washer 47.

I claim:

1. Torsion damper having several circumferentially acting elastic damping stages and several axially acting friction stages, comprising a hub (17) designed to be connected to a shaft, and a main damping stage (20) having a hub disc (22) equipped with internal teeth mounted with predetermined angular clearance on external teeth of the said hub, two guiding washers (13, 14) disposed axially on each side of said hub disc and elastic means (23a, 23b) interposed circumferentially between the hub disc (22) and said guiding washers, characterized in that a main friction stage (45) is arranged on each side of one (14) of the guiding washers (13, 14), axially, and has two bearing washers (47, 48) disposed on each side of said guiding washer and joined by braces (49) of axial orientation passing through said guiding washer, a friction washer (50) coupled with respect to rotation to said hub disc and inserted between the guiding washer and one of the bearing washers (47, 48), and an elastic clamping washer (56) inserted between the same guiding washer and the other bearing washer (47).

2. Torsion damper according to claim 1, characterized in that another friction stage (60) is arranged in an annular space made radially on the inside of the elements constituting said main friction stage (45) between said hub and the same guiding washer (14).

3. Torsion damper according to claim 2, characterized in that said another friction stage comprises an annular bearing (62), fixed with respect to rotation to the guiding washer (14), a protective washer (64) inserted axially between a radial shoulder on the hub and the bearing and an axially acting elastic washer (63), inserted between the bearing and the guiding washer.

4. Torsion damper according to claim 1, characterized in that an intermediate friction stage (70) is arranged between the hub disc (22) and the guide washer (14) of the main friction stage, and in that the intermediate friction stage (70) has a friction washer (76) in contact with said hub disc, the friction washer comprising means of meshing with clearance with said hub, a bearing washer (74) in contact with said friction washer (76), connected with respect to rotation by means of lugs (78) to said guiding washer and an elastic clamping washer (72) inserted between this bearing washer and one of the bearing washers of the main friction stage.

5. Torsion damper according to claim 4, characterized in that the aforementioned washers constituting the main friction stage (45) and the intermediate friction stage (70) have similar diameters.

6. Damper according to claim 4, characterised in that the lugs (78) of the bearing washer (74) of the intermediate friction stage (70) pass through holes (79) in the guiding washer (14) radially above the braces (49) of the main friction stage (45), the braces (49) also passing through the holes.

7. Damper according to claim 6, characterised in that the lugs,(78) of the bearing washer (74) of the intermediate friction stage (70) are extended and deformed end for the integration of the friction washer (74) its elastic clamping washer (72) associated with the sub-assembly consisting of guiding washer (14) and main friction stage (45).

8. Torsion damper according to claim 1, characterised in that the friction washer (50) of the main damper is coupled with circumferential clearance to the hub disc (22).

* * * * *